Figure 1:
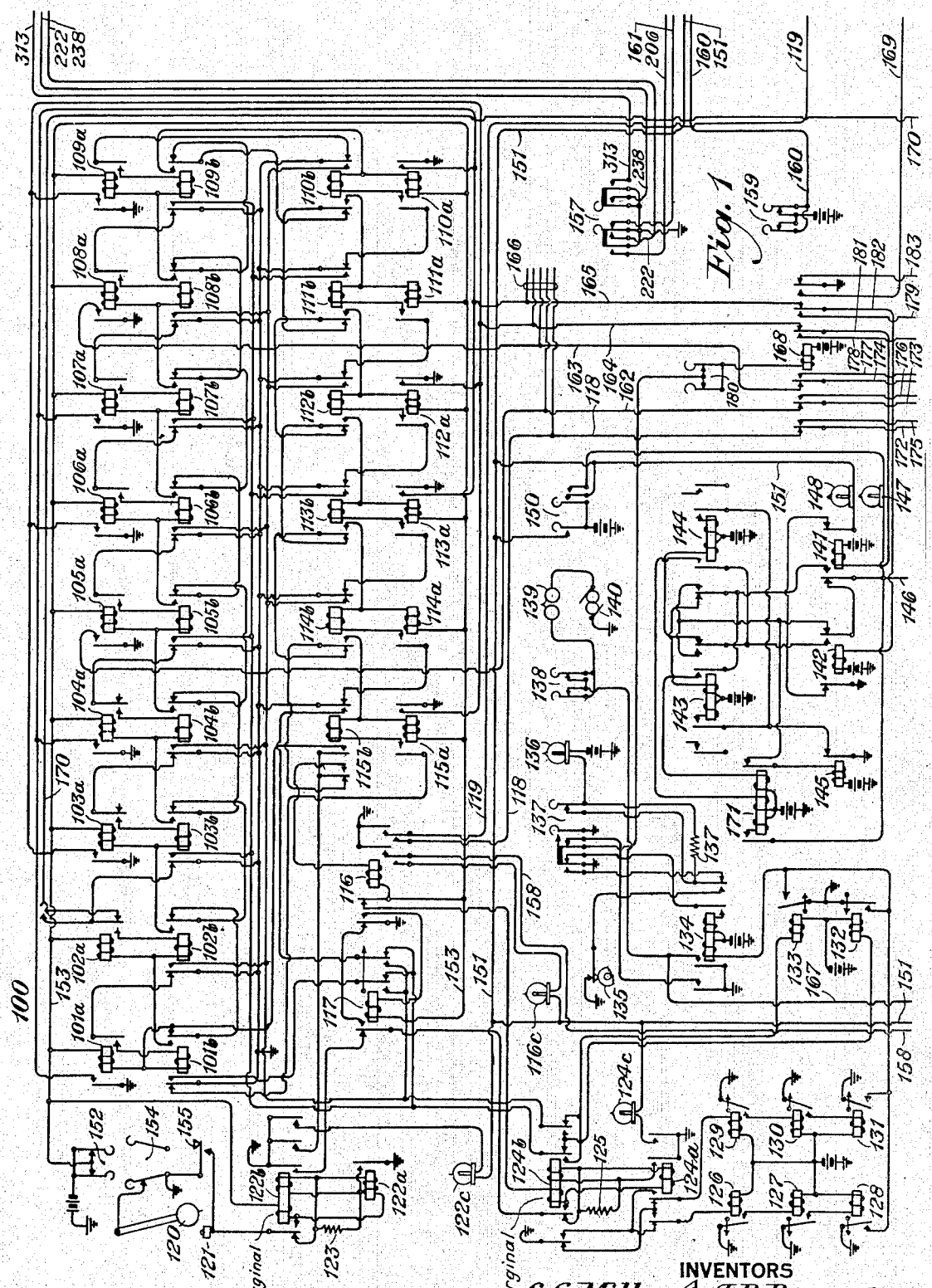

June 11, 1935.  C. G. MILLER ET AL  2,004,248
TIME ANNOUNCING SYSTEM
Filed Dec. 22, 1933  10 Sheets-Sheet 8

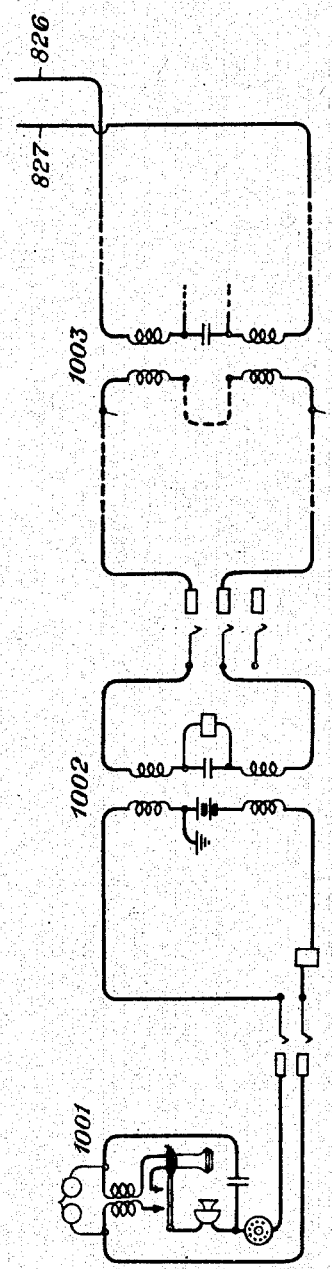

Patented June 11, 1935

2,004,248

UNITED STATES PATENT OFFICE 2,004,248

TIME ANNOUNCING SYSTEM

Charles Gideon Miller, Montclair, and Allen Rudolf Bonorden, Fanwood, N. J., assignors to American Telephone and Telegraph Company, a corporation of New York Application December 22, 1933, Serial No. 703,654

14 Claims. (Cl. 179—6)

This invention relates to telephone exchange systems, and more particularly to systems in which a subscriber by calling a particular line designation either by dialing as in machine switching systems, or by the aid of an operator as in manual systems, may obtain a connection with a central time announcement bureau from which, at specified intervals, announcements are made of the correct time of day.

Heretofore it has been proposed to provide a time announcing mechanism for an office in which a plurality of subscribers' lines terminate which may be automatically selected by any calling subscriber of the office through the dialing of a line designation set aside for that purpose. Upon the seizure of the announcing mechanism from one or a plurality of subscribers' lines, the mechanism through phonographic means, for example, as is disclosed in Patent No. 1,227,523, granted to J. G. Blessing on March 22, 1917, or through photographic sound producing means, for example as shown in Patent No. 1,618,242, granted to G. K. Thompson on February 22, 1927, transmits automatically to the subscriber's line the hour and minute of the time of day.

The invention described herein also embodies a time announcing mechanism utilizing photographic sound producing means for which purpose the call announcer mechanism disclosed in Patent No. 1,645,573, granted to H. M. Bascom on October 18, 1927, is adapted to this invention.

One time announcing system, to which further reference will be made, is described in Patent No. 1,863,137 granted to C. W. Keckler et al, on June 14, 1932, and in coissued Patents No. 1,862,519, 1,863,139 and 1,863,141 granted to R. F. Massonneau, W. B. Prince and H. G. W. Brown, respectively, June 14, 1932. This system embodies a comprehensive distributing network of trunks for serving a plurality of central offices in a metropolitan area from a central time bureau where time announcements are made orally by an operator at periodic intervals.

It is one of the objects of this invention to replace such operator by means of a clock-controlled machine so that at periodic intervals the machine is caused to announce the correct time, such announcement being heard in the form of speech by any telephone subscriber who may be connected to the network of time announcement trunks for the purpose of obtaining the correct time.

A further object is to insure a high degree of accuracy and continuity of service for which purpose two machines and associated clock-operated controls are contemplated, each acting as check on the other. Either machine may furnish the service and in the event of certain types of failure, the service will be automatically taken over by the second machine.

Other and further objects of the invention will be apparent from the following description when considered in connection with the accompanying drawings designated Fig. 1 to Fig. 10, inclusive, which when arranged in the order shown in Fig. 11 illustrate a circuit diagram of a system embodying this invention.

General description

Referring to the drawings, Fig. 1 shows at 100 a group of 15 pairs of counting relays, the progressive operation and release of which is controlled by isochronous electrical pulses obtained from a clock pendulum. For the purpose of illustration, it is assumed that the period of the clock pendulum is one second; hence, two electrical pulses per second may be obtained. A source of isochronous electrical pulses of any other period may be used, it only being necessary that the period be a submultiple of the interval elapsing between successive pronouncements of the time. The arrangement is such that once each second, one of the 15 pairs of relays operates. At the end of one-quarter of a minute the 15th pair operates after which the cycle of count is repeated. This produces a single pulse controlling the quarter-minute group of counting relays shown as relay group 200 on Fig. 2. Four such quarter-minute pulses are counted by this group which thereupon originates one pulse to control the 10 pairs of counting relays which constitute the minute group shown as relay group 210. When this group of relays has counted 10 one-minute pulses, it originates a single pulse into the 10-minute counting relay group indicated as relay group 220. When six 10-minute pulses have been counted by the six pairs of counting relays in this group, indicating the duration of 60 minutes or one hour, this group originates a pulse to advance the hour group of counting relays designated as relay group 300 on Fig. 3. The setting of the quarter-minute, one-minute, 10-minute and hour counting relay groups controls the setting of the associated quarter-minute, one-minute, 10-minute and hour selection relays shown, respectively, at 500 in Fig. 5, 400 in Fig. 4, 510 in Fig. 5, and 600 in Fig. 6. The selection relays control the order and selection of the film records from which is generated the speech making up the complete time pronouncement.

Figure 8:
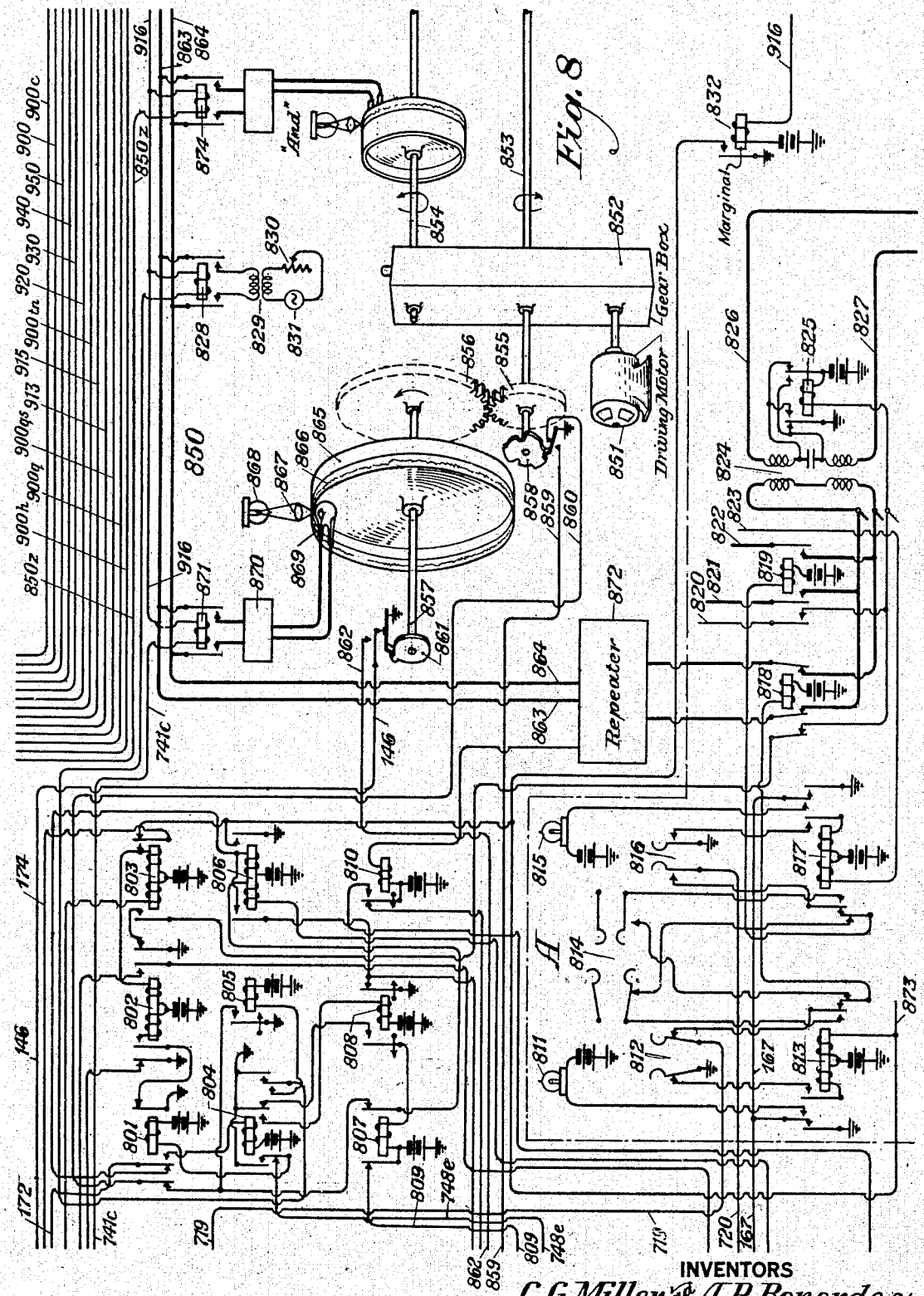
Figure 9:
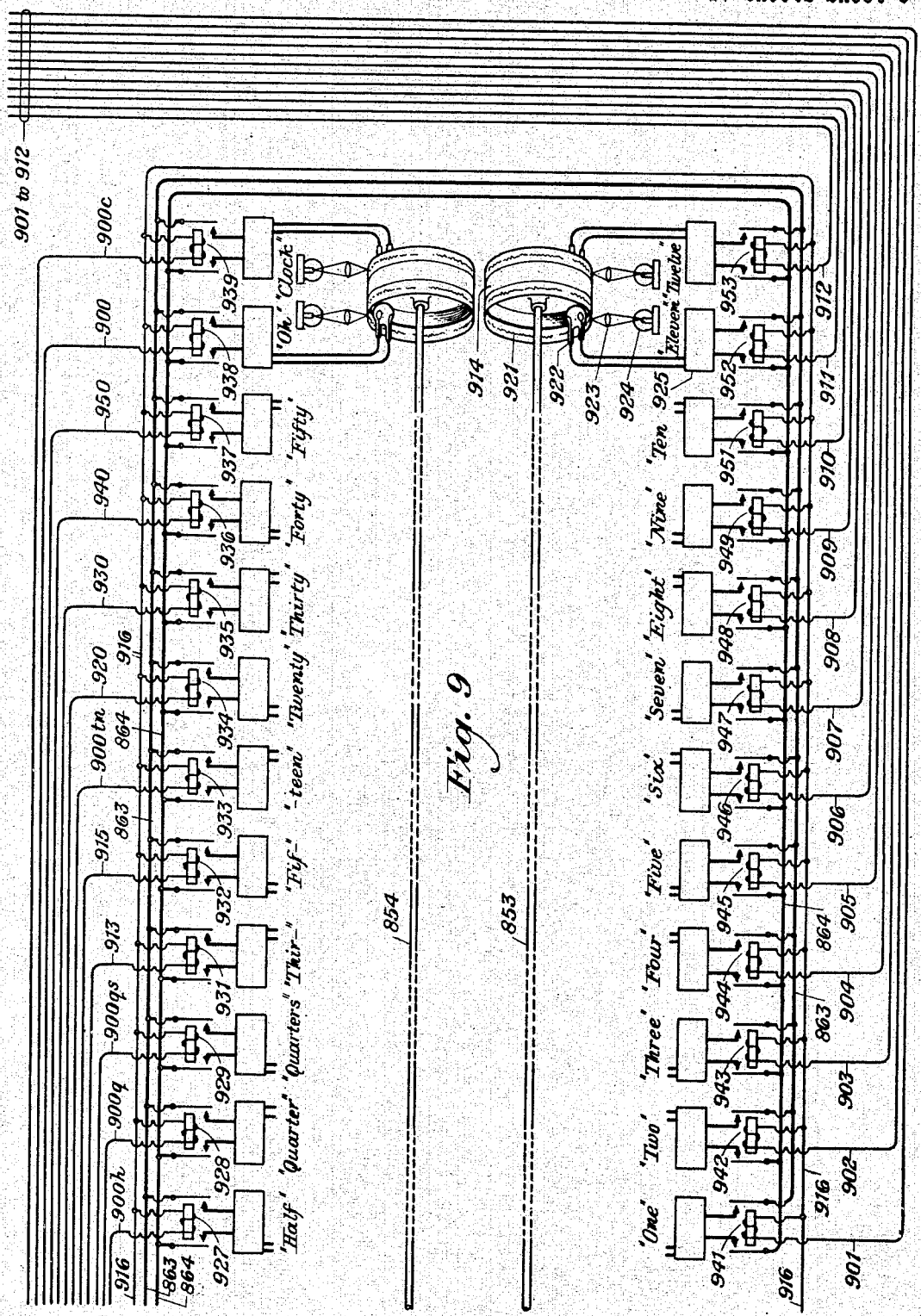

The time pronouncing machine is shown on Figs. 8 and 9. This machine takes the form of the call announcer machine which is described in the aforementioned Patent No. 1,645,573, granted to H. M. Bascom. Referring to Figs. 8 and 9, motor 851 drives two shafts, 853 and 854, through the necessary reduction gears in gear box 852. On shaft 854 are 13 film drums, and on shaft 853, 12 film drums. A description of one such drum and associated parts will suffice for all drums on these shafts. A wide flanged wheel 914 has on an extension of its flange a strip of photographic film 921, on which are recorded in the form of striations or otherwise, three records of the oral sound of the word "eleven", equally spaced about the periphery. Outside of the circumference of the film is located the stationary source of illumination 924, whose light when concentrated by the proper optical system indicated as 923, falls on photoelectric cell 922 after passing through the interposed film. Associated with the photoelectric cell is an amplifier 925, and speech cut-in relay 952. The operation of this relay during the period that one of the three records is passing the light source will connect the output of the amplifier to the common repeater 872 (Fig. 8).

As previously stated, there are 12 film drums on shaft 853, each film drum bearing three oral records of the same word, but each film drum containing oral records of a different word; these are the oral sounds represented by the numerals "one" to "twelve", inclusive. Similarly mounted on shaft 854 are 13 film drums containing oral records of the words "oh", "clock", and "and", "half", "quarter", "thir-" (the first syllable in the numeral "thirteen"), "fif-" (the first syllable in the numeral "fifteen"), "-teen" (the last syllable in the numerals "thirteen", "fourteen", "fifteen", etc.), and the numerals "twenty", "thirty", "forty", and "fifty".

A third shaft 857 carries a 26th film drum 866, with associated light source photoelectric cell, amplifier, etc. This film contains an oral record of an introductory phrase, such as for example, "When you hear the tone signal it will be exactly". Shaft 857 is driven through gears 856 and 855 from shaft 853. For convenience in description we may assume the small drums to make one third of a revolution each half second, and the large drum one revolution each three seconds. It is convenient, although not necessary, that one revolution of the large drum correspond to a multiple of a single pronouncement cycle of the small drum. Use is made of cams 861 and 858 on shafts 857 and 853, respectively, to effect the operation and release of the speech cut-in relays at the silent point in the revolution of the respective film drums.

By the proper selection of film drums and the progressive operation and release of their associated speech cut-in relays a complete pronouncement can be generated such as "when you hear the tone signal it will be exactly twelve oh clock" prior to the precise instant of time to which the pronouncement refers. A tone signal is then generated at precisely 12:00 o'clock. Subsequent time pronouncements follow one another at 15 second intervals. These are as follows, each being preceded by the introductory phrase:

"Twelve oh and one quarter"
"Twelve oh and one half"
"Twelve oh and three quarters"
"Twelve oh one"
"Twelve oh one and one quarter"

and so on.

The hour and minute announcements from 12:10 to 12:19¾ take the form

"Twelve ten"
"Twelve eleven"
"Twelve twelve"
"Twelve thir- teen"
"Twelve four- teen"

and those from 12:20 take the form

"Twelve twenty"
"Twelve twenty one"
"Twelve twenty two", etc.

These are, of course, followed when necessary by the proper quarter minute announcement and are preceded by the introductory phrase.

Fig. 10 shows the principal elements in a distributing system such as that disclosed in the aforementioned Patent No. 1,863,137, whereby the subscriber's call may be terminated at the output of repeater 872 (Fig. 8) over conductors 826 and 827. In Fig. 10 the telephone set of a calling subscriber is shown at 1001. The subscriber having dialed the proper number is connected, through the medium of a line finder and district circuit 1002 to a time announcement trunk circuit 1003 common to the subscriber's central office. Trunk circuit 1003 is connected by interoffice conductors 826 and 827 to one side of repeating coil 824. The other side of this repeating coil, in common with other and similar repeating coils, is connected to the output of repeater 872 of the particular time pronouncement machine giving the time service.

*Operation*

A description of the detailed method of operation will now be given: When locking key 154 (Fig. 1) is operated in the direction shown, ground is connected to pendulum 120 which, as stated before, has a period of one second. Twice each second it closes a suitable contact, such as a mercury cup 121. On the first contact, following the operation of key 154, relay 122a operates over a circuit from battery at key 152, left winding of relay 122b, winding of relay 122a, the left normal contact of relay 122b, through the aforementioned mercury cup and pendulum to ground at key 154. Relay 122a, operating, connects ground through its front contact, through resistance 123 and right winding of relay 122b in parallel. The ground supplied by the pendulum acts to short-circuit resistance 123 and the right winding of relay 122b. Relay 122b is marginal and does not operate under this condition. When the pendulum contact breaks, its short-circuiting effect is removed from the right winding of relay 122b, thus permitting it to operate. When the pendulum contact makes the second time in each second, ground is connected to the left make contact of relay 122b, short-circuiting relay 122a and the right winding of relay 122b. Under this condition relay 122b remains operated but relay 122a releases. When the pendulum ground is opened, relay 122b also releases. It is apparent that once each second relay 122b is operated for approximately one-half second. This relay may, therefore, be considered as the source of "one-per-second" pulses.

*One second counting relay group 100*

When relay 122b operates during the first second, a path is closed for operating the first pair of counting relays. Ground at the right middle make contact of relay 122b, over a control lead extending through the left outer normal contact of relay 115b, the left normal contacts of relays 114b, 113b, 112b, 111b, and 110b, the right normal contacts of intervening "b" relays and right normal contact of relay 101b, to a point common to the windings of relays 101a and 101b, through the winding of relay 101a to battery on lead 153. Relay 101a operates, extending ground from the left break contact of relay 102b, through its own right make contact, through the winding of relay 101b to the aforementioned common point. Relay 101b does not operate since it is short-circuited by the ground at relay 122b. When relay 122b releases, removing the short circuit, relay 101b thereupon operates, transferring the control lead from its right back contact through its front contact to the succeeding pair of relays, viz., relays 102a and 102b.

On the second operation of relay 122b, relay 102a is caused to operate over the previously traced path which now includes the right front contact of relay 101b. Relay 102a prepares a locking path which includes the winding of relay 102b. When relay 122b releases, relay 102b operates, transferring the control lead to the succeeding pair of counting relays and opening the holding circuit of the preceding counting relay pair, in this case, relays 101a and 101b. This sequence of operations continues; once each second the succeeding pair of counting relays is caused to operate, advancing the control lead to the next pair beyond and opening the holding path of the preceding operated pair which thereupon releases. This progression continues through to the 15th pair of counting relays.

When counting relay pair 115 is operated the control lead is extended directly to the windings of relay 101a, and relay 116. Following the 31st contact of the pendulum, relay 122b is again operated, operating relay 101a, thus starting another cycle of progress through the 15 pairs of counting relays. In this case, relay 116 also operates over a path which includes the left outer make contact of relay 115b. On the release of relay 122b, relay 101b operates and relay 116 releases. Relay 101b, operated, opens the locking path of relay pair 115 which thereupon releases.

Figure 2:
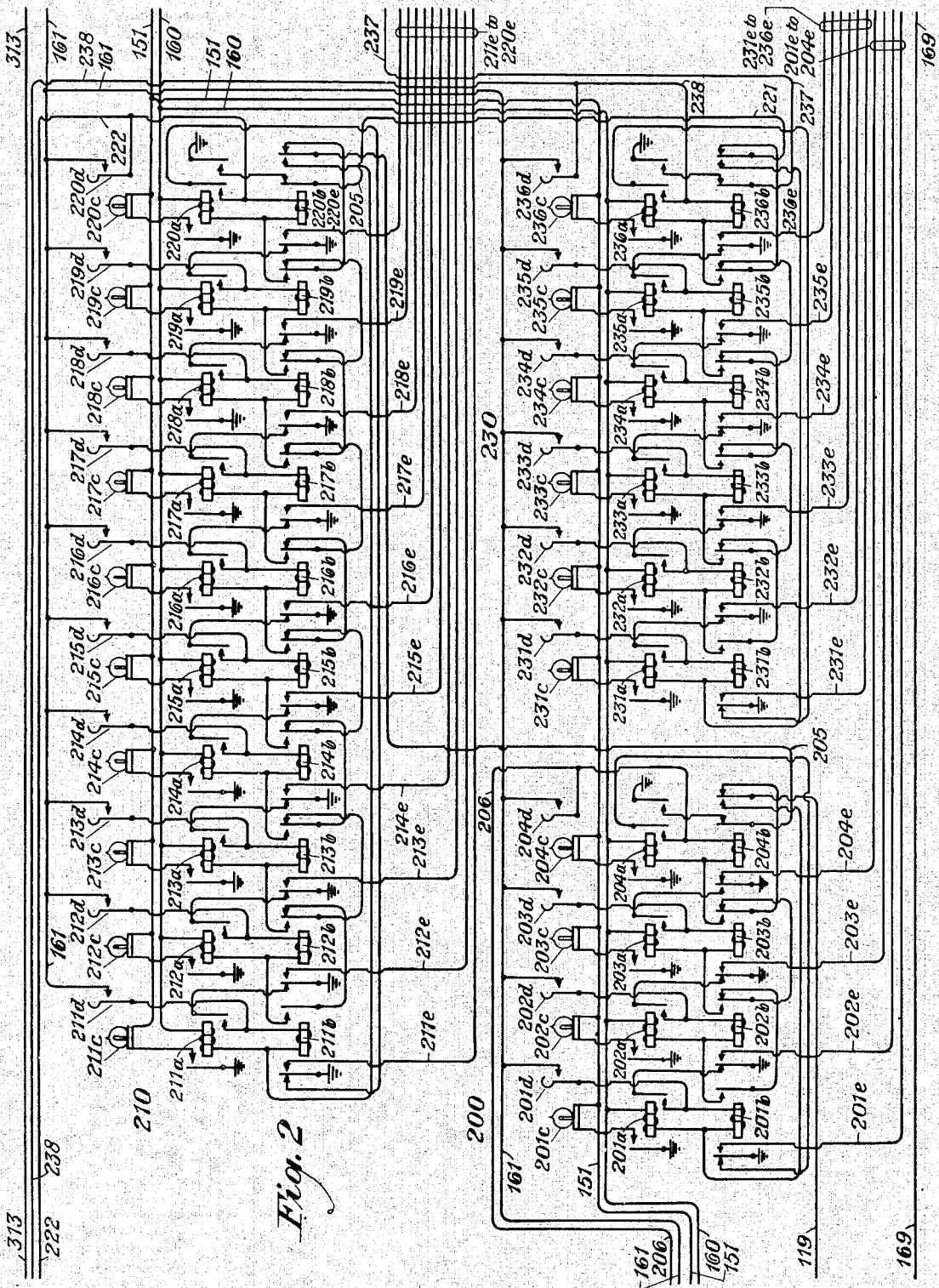

During the approximate half-second period that relay 116 is operated, among other functions to be explained later, it connects ground through its right outer make contact to lead 119. Thus, once every 15 seconds lead 119 is grounded for approximately one-half second. This "one-per-quarter minute" pulse is used to advance progressively the four pairs of counting relays in the quarter-minute counting relay group 200 (Fig. 2).

*Initial setting of time counting relays*

Figure 3:
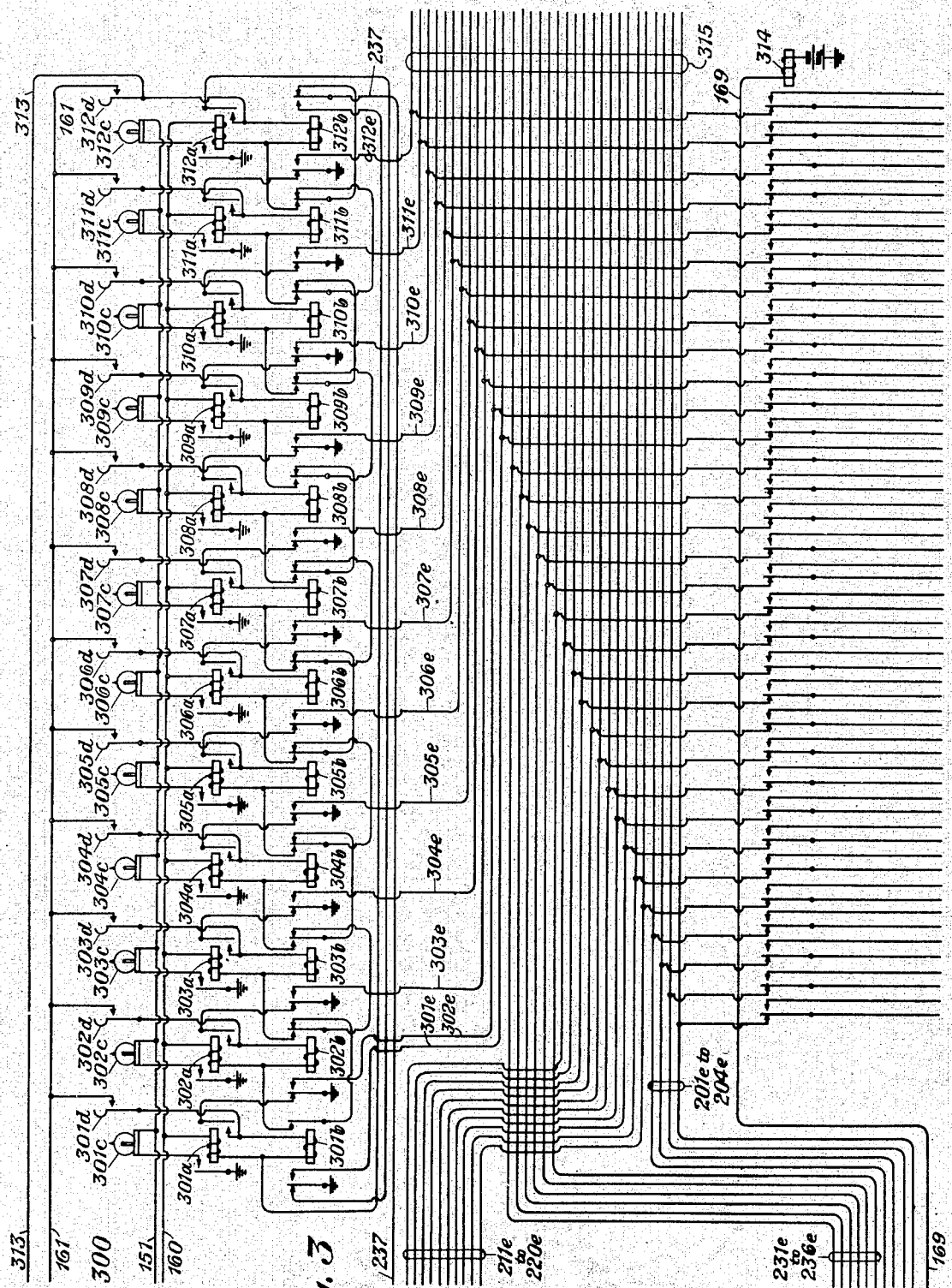
Figure 4:
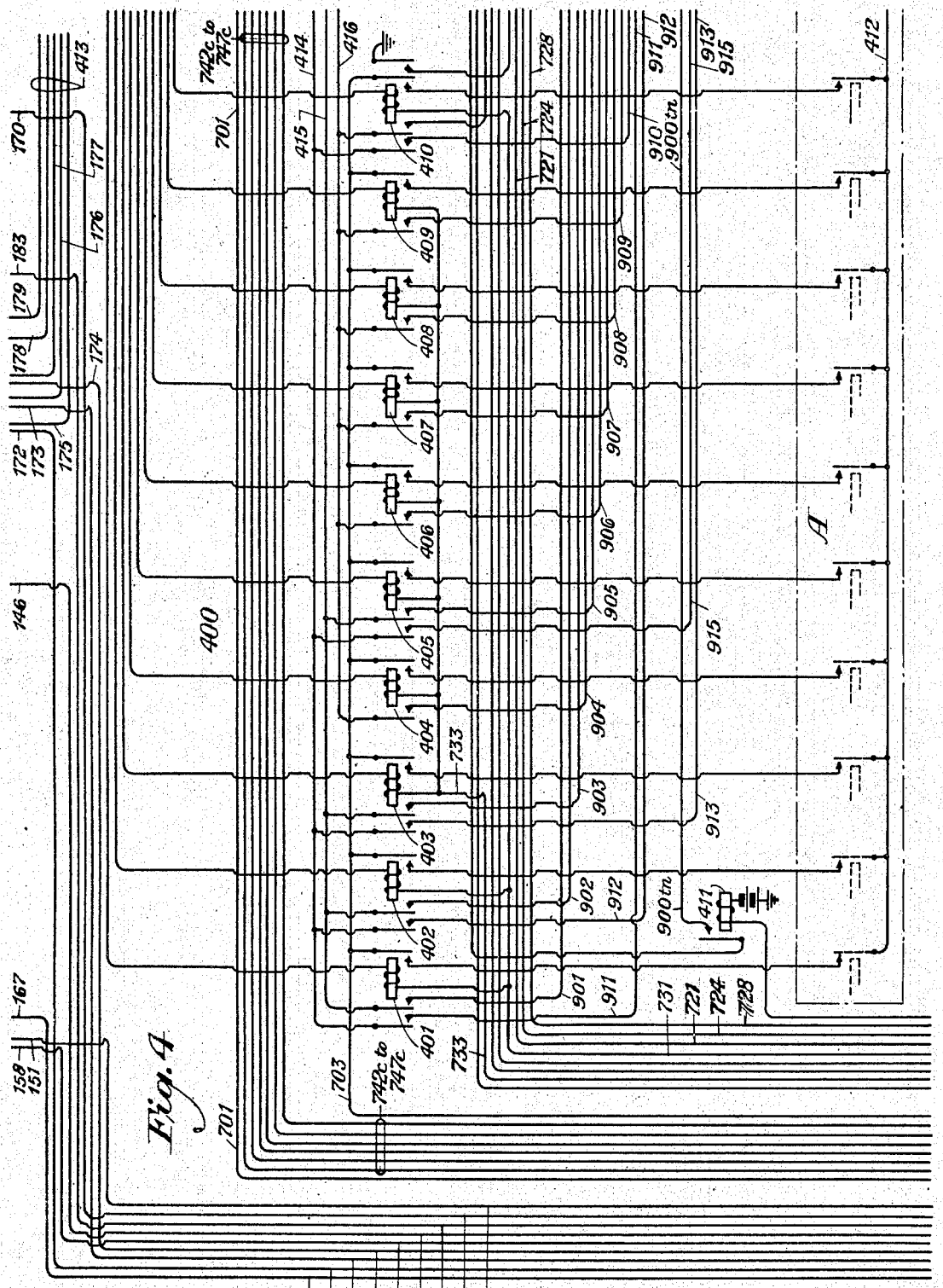
Figure 5:
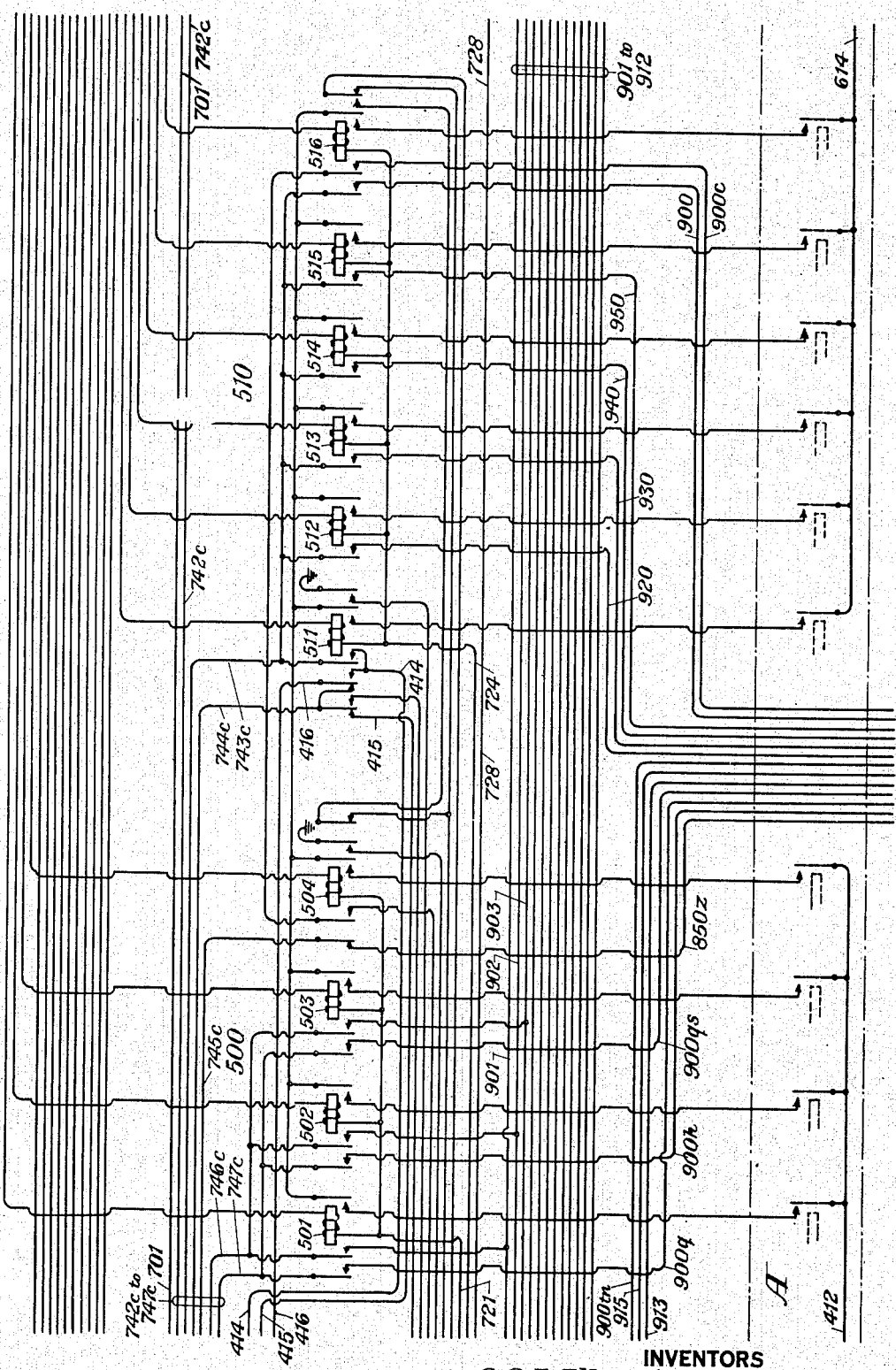
Figure 6:
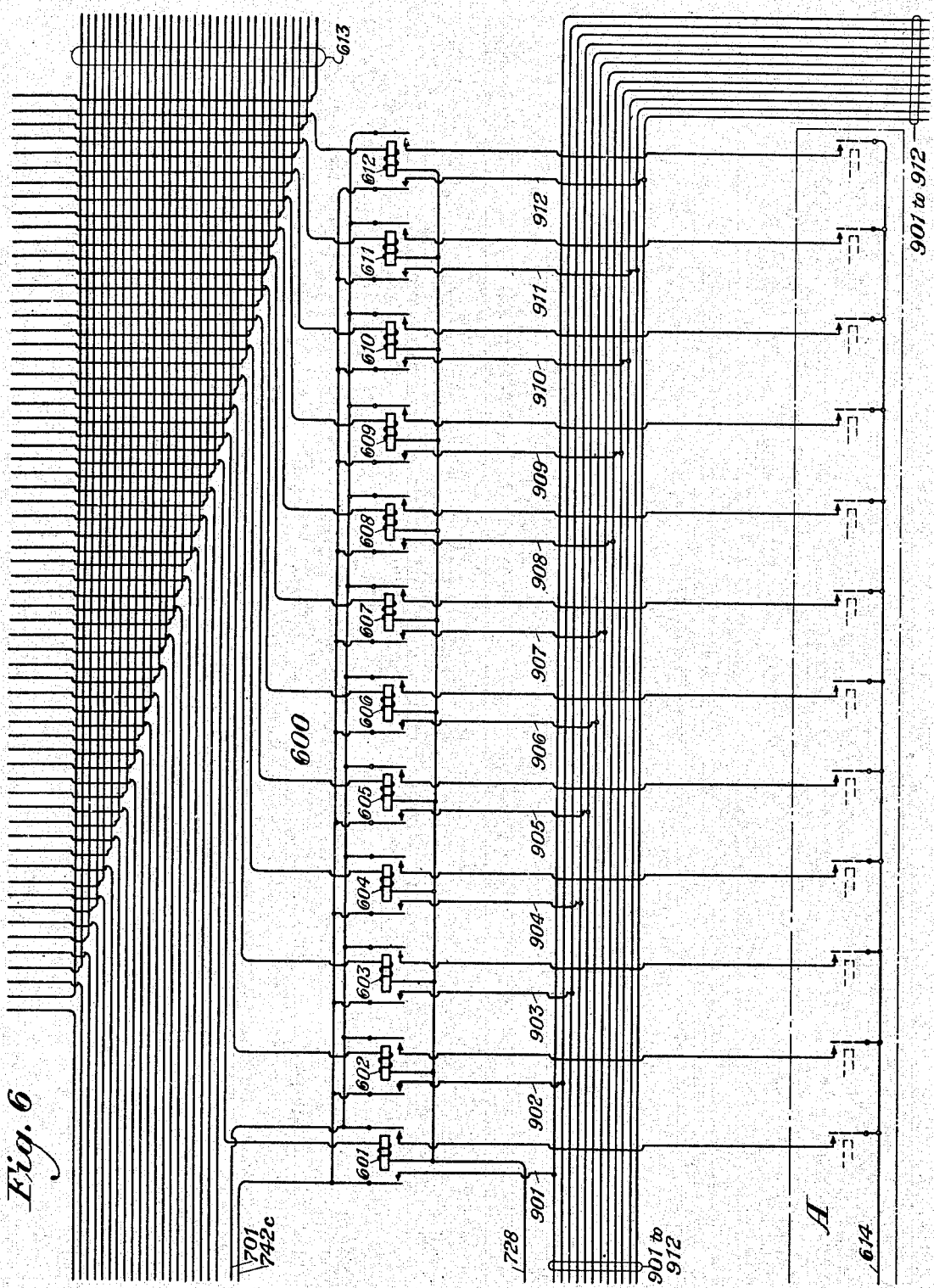

Following the operation of locking key 154 it is necessary to operate one pair of counting relays in the quarter-minute group 200, one-minute group 210, 10-minute group 230, and hour group 300 (Fig. 3). Assuming key 154 is operated precisely at 11:45¼ then the next pronouncement will be 11:45½. To set the relays, non-locking key 159 is operated and released removing battery from lead 160 momentarily, thus causing the release of any operated pair of relays in the aforementioned groups. Locking key 150 is operated in order to connect battery to lead 151 and all indicating lamps such as 201c, 202c, etc.

Non-locking keys 311d, 234d, 215d and 202d are each operated momentarily causing the operation of the associated relay pairs 311, 234, 215 and 202, respectively, over individual obvious circuit paths. These relay pairs remain locked through the right make contact of the "a" relay and the left normal contact of the "b" relay in the succeeding pair. Their operation is indicated by the lighting of the respective lamps 311c, 234c, 215c and 202c. These lamps may be designated "11", "4", "5" and "½" thus indicating visually the time to be announced prior to the next time signal.

If it is desired to set the counting relays for 12 o'clock, non-locking key 157 alone may be operated momentarily instead of the individual non-locking keys. In this case relay pairs 312, 236, 220 and 204 operate and lock.

*Counting relay groups 200, 210, 230 and 300*

Assuming that relay pair 202 was operated in the manner stated then when lead 119 is next grounded in the manner previously described, a path to battery on lead 160 is completed through the right outer normal contact of relay 204b, right normal contact of relay 203b, right make contact of relay 202b and winding of relay 203a which operates. Relay 203a, operated, lights the associated lamp 203c (provided locking key 150 is operated) and prepares the usual locking path which includes the winding of relay 203b. Relay 203b operates when the ground is removed from lead 119. When relay 203b operates it opens the locking path of counting relay pair 202 at its left normal contact, grounds lead 203e, and advances the extension of lead 119 to counting relay pair 204. Counting relay pair 202 releases. Relay 202a, released, also opens the locking path and extinguishes lamp 202c. Relay 202b, released, removes ground from lead 202e, restores ground to right armature of relay 201a and closes the break in the control path through its right normal contact.

When lead 119 is momentarily grounded 15 seconds later, counting relay pair 204 is caused to operate in a similar manner and pair 203 is released. The completion of the next pulse on lead 119 leaves counting relay pair 201 operated which in turn releases pair 204. In this manner counting relay pairs 201 to 204 are each operated and released in numerical sequence once each minute.

During the approximate half-second period at the beginning of each minute that relay 204a is operated and relay 204b is normal, lead 205, extended through the right inner normal contact of relay 204b, is grounded at the right outer make contact of relay 204a. This "one-per-minute" pulse causes a similar progressive operation and release in numerical sequence of the 10 pairs of counting relays in the minute relay group 210.

Counting relay pair 220, operating once each 10 minutes, originates a "one-per-ten-minute" pulse by grounding lead 221 for approximately one half second at the beginning of each 10 minute period which causes a progressive operation and release in numerical sequence of the six pairs of counting relays in the 10-minute relay group 230. Similarly, counting relay pair 236, operating once each 60 minutes, originates a "one-per-hour" pulse by grounding lead 237 for approximately one half second at the beginning of each hour period to cause a progressive operation and release in numerical sequence of the 12 pairs of counting relays in the hour relay group 300.

*Selection relays*

Each operated pair of counting relays in relay groups 200, 210, 230 and 300 causes the operation of a corresponding selection relay in the corresponding quarter-minute, one-minute, ten-minute and hour selection relay groups 500, 400, 510 and 600, respectively. Assuming the next time signal will occur at 11:45¾, counting relay pairs 311, 234, 215 and 203 will have been operated under normal operation at 11:00, 11:40, 11:45 and 11:45½ respectively. The following circuit paths will then be closed.

Ground at left make contact of relay 311b, lead 311e, normal contact of multi-contact transfer relay 314, winding of selection relay 611, common lead 128, winding of marginal relay 729 to battery. Ground at left make contact of relay 234b, lead 234e, a normal contact of relay 314, winding of selection relay 514, common lead 724, winding of marginal relay 725 to battery. Ground at left make contact of relay 215b, lead 215e, a normal contact of relay 314, winding of selection relay 405, common lead 733, windings of sensitive relay 734 and marginal relay 736 to battery. Ground at left make contact of relay 203b, lead 203e, a normal contact of relay 314, winding of selection relay 503, common lead 721, winding of marginal relay 722 to battery.

Selection relays 611, 514, 405 and 503 operate under this condition, but the associated series marginal relays 729, 725, 736 and 722 do not. Should two or more selection relays in the same group be energized because of trouble conditions, the associated marginal relay will operate and block the pronouncement in the manner to be shown later.

Selection relay 611 operated connects lead 742c, which is common to all selection relays in the 600 group, through its left make contact to lead 911. Similarly, selection relay 514 connects common lead 743c to lead 940. Selection relay 405, operated, closes a path from common lead 744c, left outer normal contact of relay 511, lead 415, left inner make contact of relay 405 to lead 905. Selection relay 503 at its left inner make contact connects common lead 746c to lead 903 and at its left outer make contact connects common lead 747c to lead 900qs. Lead 745c remains connected to lead 850z through the left outer normal contact of relay 504.

Leads 911, 940, 905, 850z, 903, 900qs terminate, respectively, at the windings of speech cut-in relays 952, 936, 945, 874, 943 and 929 which will if operated connect respectively, the output of the film records "eleven", "forty", "five", "and", "three", and "quarters" to the input of repeater 872. It only remains necessary to ground each of leads 742c, 743c, 744c, 745c, 746c, and 747c for the proper interval of time and in the sequence enumerated to obtain the announcement "eleven forty-five and three quarters". The manner in which this is accomplished is described under the section entitled "Announcement of time".

Certain film records are selected by a combination of operated selection relays instead of by a single relay. Once each hour, from 59′45″ to 59′60″ past the hour, lead 744c is connected to relay 938 to control the record "clock". The circuit path is lead 744c, left middle normal contact of relay 511, lead 416, left inner make contact of relays 410, 504 and 516, lead 900c to relay 938.

From 9′45″ to 19′45″ past the hour lead 743c is extended through the left inner make contacts of relay 511 to lead 414 which in turn is connected with lead 416 through the left middle make contact of the same relay. Lead 414 is common to relays 410, 401, 402, 403 and 405 which when operated connect this lead through their left outer make contacts to control the output of film records "ten", "eleven", "twelve", "thir-" and "fif-", respectively. Similarly lead 416 is common to relays 404 and 406 to 409 inclusive to control respectively the output of film records "four", and "six" to "nine" inclusive.

From 12′45″ to 19′45″ past the hour the film record "-teen" must be placed under control of lead 744c. This is accomplished as follows. Relay 734 is in series with the battery feed common to relays 403 to 409, inclusive, and is, therefore, operated for this period. Relay 411 operates over a path through the make contact of relay 734 to ground at right outer make contact of relay 511. Lead 744c is thus extended through the left outer make contact of relay 511, the make contact of relay 411, lead 900tn, to relay 933 controlling the output of film record "-teen".

Announcement of time

Precisely 11 seconds before the time signal is transmitted, i. e., when counting relay 105a is operated, a check is made of certain functions preparatory to the pronouncement. Ground at the left make contact of relay 105a, lead 162, left middle normal contact of transfer relay 168, winding of relay 751 of battery. Relay 751 operates connecting battery to lead 749 which is common to the right windings of check relays 752 to 758, inclusive. These relays operate connecting ground through their left or high-resistance winding to leads 741c to 747c, respectively.

When counting relay pair 105 releases one and one-half second later, relay 751 also releases removing battery from the right windings of relay 752 to 758, inclusive. Relays 753 to 758 remain locked because leads 742c to 747c, inclusive, as was shown, were connected by the operated selection relays to the windings of the respective speech cut-in relays, 952, 936, 945, 874, 943 and 929. Relay 752 also remains locked up because lead 741c terminates at the winding of speech cut-in relay 871. The left windings of relays 752 to 758 are sufficiently high in resistance as to prevent the associated series connected speech cut-in relays, and relay 832 which are marginal, from operating. The purpose of relays 752 to 758, inclusive, is to check the continuity of the paths required to operate the speech cut-in relays. In the event any path is open the corresponding relay in the 750 group will not remain locked up and it will, therefore, prevent the subsequent closure of a chain circuit, to be next described.

Following the release of relay 751 a chain circuit is completed; battery through the left winding of relay 803, normal contacts of relays 736, 729, 725, 722, 751, 741b, 742b, make contacts of relays 752, 753, normal contacts of relays 743b and 744b, make contacts of relays 754 and 755, normal contacts of relays 745b and 746b, make contacts of relays 756 and 757, normal contacts of relays 747b, and 748b, make contact of relay 758, left outer normal contact of relay 802 to ground. If this chain circuit is continuous it is an indication that the equipment is prepared to make a complete pronouncement. The effect of an open chain circuit will be discussed later.

Relay 803, in the aforementioned chain circuit, operates and connects ground from the right normal contact of relay 802 through its own left make contact and outer left make contact of relay 818, winding of relay 825 to battery, operating relay 825. This relay on operating reverses the battery and ground with respect to leads 826 and 827 which connect with the aforementioned network of time announcement trunks the essential parts of which are shown in Fig. 10. This reversal may be used to control certain relays (not shown) in all trunks, such as 1003, to effect a cut through condition for the purpose of enabling the subscriber to hear the pronouncement of the time. Calls connected to time announcement trunks subsequent to the operation of relay 825 would not be cut through until 15 seconds later when the series of events now being described is repeated.

Eight seconds before the time signal, the start circuit is closed to effect the pronouncement by progressively operating the pairs of relays in the pronouncement relay group 740. This procedure is initiated when counting relay 108a operates. Ground at left make contact of relay 108a, lead 163 left inner normal contact of relay 168, lead 174, right make contact of relay 803 to battery through the right windings of relays 803 and 802 in parallel. Relay 802 operates, opening at its left normal contact, the chain circuit which includes the left winding of relay 803 which, however, is held operated through its right winding until relay 108a releases.

In the event the previously described chain circuit was open, relay 803 would not have been operated in which event the ground from the left make contact of relay 108a would be extended through the right normal contact of relay 803, right winding of relay 813 to battery. Relay 813 would, therefore, operate and effect a transfer of the service to the other machine in the manner to be described later.

Assuming, however, the chain circuit was properly closed then when relay 802 operates, it locks through its left winding to ground at relay 801. Relay 802 operated also opens the operating path of all relays 825 which release restoring battery and ground to leads 826 and 827, respectively, of all trunks. This may set up a condition on all calls previously cut through to the time announcement system which will cause a charge to be made when the calling subscribers subsequently disconnect. Relay 802, operated, also prepares a circuit for starting the announcement with the aid of cams 861 and 858 whose relation with each other and the film drums will now be described.

Cam 861 grounds leads 862 and 146 momentarily once each revolution just prior to the beginning of the introductory phrase on drum 866. Similarly, the three lobed cam 858 grounds lead 859 thrice in each revolution. The relation between the leading edges of the three cam lobes is such that lead 859 is grounded as the blank or silent portion of the small film drums is passing the light beam. When a portion of the speech record has passed the light beam, cam 858 removes the ground from lead 859 and grounds momentarily lead 860 for the purpose of checking the output of the record in the manner to be described later. The relation between shafts 853 and 857 is such that leads 859 and 862 are grounded simultaneously but that the ground on lead 859 is removed before that on lead 862.

Following the operation of relay 802 the subsequent closure of the contacts at cam 861 starts the pronouncement. Ground at cam 861 over lead 862, outer left normal contact of relay 742b, right make contact of relay 802, left normal contact of relay 741b, winding of relay 741a, lead 809, left normal contact of relay 807 to battery. Relay 741a operates and prepares, through its left inner make contact, the usual locking circuit path which includes the winding of the associated "b" relay. Relay 741b operates when the ground on lead 862 is removed by the further rotation of cam 861. Relay 741a, operating, also closes the following circuit path to operate speech cut-in relay 871: ground through the right normal contact of relay 808, right make contact of relay 741a, right normal contact of relay 742a, lead 741c, winding of relay 871, common lead 916, winding of marginal relay 832 to battery. Relay 871 operates and relay 752, which is also connected to lead 741c, is short-circuited and, therefore, releases, opening its holding circuit. Marginal relay 832 does not operate. It will be seen that relay 871 is caused to operate just before the beginning of the introductory speech recorded on film drum 866. During its revolution the record is electrically transmitted through the medium of the photoelectric cell 869 and amplifier 870, over leads 863 and 864, repeater 872, make contacts of relay 818 and left windings of all repeating coils such as repeating coil 824. Here it is transformed through the right windings of each repeating coil thence over interoffice trunk conductors such as 826 and 827 of the aforementioned trunk network to all subscriber lines previously cut through to this system and thereby reproduced as speech in the telephone receivers at the subscriber stations.

At the completion of one revolution of drum 866, cam 861 again grounds leads 146 and 862. Ground on lead 862 over the previously described path to the left armature of relay 741b now continues through the make contact of this relay, left normal contact of relay 742b, winding of relay 742a lead 809, contact of relay 807 to battery. Relay 742a operates preparing a locking circuit at its left make contact which includes the winding of relay 742b. When the ground on lead 862 is again removed relay 742b operates. When relay 742a operates the ground previously extended to its right armature breaks from lead 741c, causing the previously operated speech cut-in relay 871 to release, and is connected through the right make contact of relay 742a, right normal contact of relay 743a, over lead 742c and path previously prepared by the selection relays to speech cut-in relay 952 which operates. The operation of relay 952 coincides with that point in the revolution of drum 921 between two of the three records thereon. The word "eleven" is, therefore, electrically transmitted to the network of announcement trunks during the further rotation of film drum 921. When relay 742b operates following the opening of lead 862 at cam 861, it transfers through its left outer transfer circuit the further advance of the 740 relay group of counting relays from control of cam 861 to cam 858.

When cam 858 next grounds lead 859 a circuit path is completed to battery through left outer make contact of relay 742b, right inner make contact of relay 802, left make contact of relay 741b, left inner make contact of relay 742b and winding of relay 743a, lead 809 to battery. Relay 743a operates, prepares the usual locking circuit at its left make contact and transfers its right armature from lead 742c to lead 743c causing speech cut-in relay 952 to release and the pre-selected speech cut-in relay 936 to operate. When cam 858 removes ground from lead 859, relay 743b operates and transfers the control lead to the succeeding pair of relays.

In this manner each of the other pre-selected speech cut-in relays 945, 874, 943, and 929 is operated in the order indicated, each remaining operated during the rotation of the respective film drums through one-third of a revolution.

Following the operation of relay pair 747 and relay 929, when cam 858 next grounds and opens lead 859, relay pair 748 is left operated. Relay 748a operating releases relay 929 by transferring the ground connected to its right armature from lead 747c to lead 748e. Ground on lead 748e through the left normal contact of relay 804, winding of relay 801 to battery causes relay 801 to operate. Relay 801 operated, opens the locking path of relay 802 which releases, and prepares a path through its left inner make contact for operating relay 804. The system is now prepared to give the time signal.

*Time signal and release*

When relay 116 operates at the end of a 15-second period, as already explained, it grounds lead 118 at its right outer alternate make contact. Ground on lead 118 through left outer normal control of transfer relay 168, lead 172, left inner make contact of relay 801 to battery through winding of relay 804 which operates, in turn operating relays 805, 828 and 808 over obvious circuit paths. The purpose of relay 805 will be explained later. Relay 808 operated prepares a path which includes the winding of relay 807. Relay 808 also opens the operating path of relay 801 but the latter is now held by the ground at the left make contact of relay 804. Relay 828 operated connects the output of repeating coil 829 to the input of amplifier 872. The input of repeating coil 829 is connected to a suitable source of tone, such as a tone alternator 831 with adjustable volume control 830. This tone is heard by the subscriber and constitutes the time signal.

When relay 116 releases one-half second after operating the operating path of relay 804 is opened and it releases, in turn releasing relays 801, 828, 805 and 808. Relay 808 is slow in releasing, hence, relay 807 operates from ground at the right normal contact of relay 804 and remains operated until relay 808 opens its left make contact. When relay 807 operates, it removes the battery from lead 809 causing the release of relay pairs in relay group 740. When relay 808 finally releases relay 807 also releases leaving the system prepared for the next announcement.

In the event relay group 740 fails to progress under the control of the cams in the manner described, relay 801 will be normal when ground appears on lead 172. In this case the ground on lead 172 will be connected through the inner normal contact of relay 801 to the right winding of relay 806 to battery. Relay 806 will operate and lock over an obvious circuit path. Relay 806 operated closes a circuit path for operating relay 813 which functions as will be described later, to transfer the service to the other time announcing machine.

*Pronouncements involving less than seven film records*

In the example given the announcement following the introductory phrase, viz., "eleven forty-five and three-quarters" involved the output of six film drums obtained by successively grounding leads 742c, 743c, 744c, 745c, 746c and 747c. When the quarter minute announcements "-and one quarter", "-and one half", "-and three-quarters" are not required the corresponding control leads 745c, 746c and 747c are made ineffective. This is the case during the last 15-second period in each minutes when counting relay pair 204 and the corresponding selection relay 504 are operated.

Relay 504, operated, disconnects, at its left normal contact, lead 745c from lead 850z and, therefore, from the winding of speech cut-in relay 874. It also closes a circuit path from ground at its right middle armature to battery through relay 735 which operates. Relay 735 in turn closes obvious circuit paths for operating relay pairs 746, 747 and 748. The "a" relays of these pairs through their right armatures extend the right make contact of relay 745a directly to lead 748c. The "b" relays make the advance circuit path ineffective beyond relay pair 745. The "b" relays also transfer their portion of the chain circuit path from their right normal to their right make contact.

Under these conditions when check relays 752 to 758 inclusive, are caused to operate in the manner previously described, only relays 752 to 755, inclusive, will remain locked up. Relays 756, 757 and 758 will release and close their portion of the chain circuit through their left normal contacts. This is the condition prior to announcements such as:
"Eleven forty-six"
"Twelve oh clock"
"One oh nine"
"Ten thir- teen"
For announcements such as:
"Three ten"
"Four twelve"
"Five oh and one half"
only one film drum is required to announce the minutes. In this case relay pair 745 is operated, and lead 744c is not connected to any speech cut-in relay. Hence, check relay 755 should be normal to effect the closure of the chain circuit previously referred to. The paths for operating relay pair 745 are three in number. (1) Ground at right outer make contact of relay 410 (which is operated for one minute beginning 9'45", 19'45", 29'45", 39'45", 49'45" and 59'45", past the hour), through the right outer normal contact of relay 516 (which is normal from 9'45" to 59'45" past the hour), windings of relays 745b and 745a to battery on lead 809. (2) Ground at right outer make contact of relay 410 as before, right outer make contact of relay 516 (which is operated for ten minutes beginning 59'45" past the hour), right normal contact of relay 504 (which is normal during the first 45 seconds in each minute) through winding of relay pair 745 to battery. (3) Ground at right outer make contact of relay 511 (which is operated for ten minutes beginning 9'45" past the hour), normal contact of relay 734 (which is normal for three minutes beginning 9'45", 19'45", 29'45", 39'45", 49'45", and 59'45" past the hour), windings of relay pair 745. The first path is used for minute announcements "ten", "twenty", "thirty", "forty", "fifty"; the second path for the minute announcement "oh" when followed by the quarter minute announcements in the first minute of each hour; the third path for minute announcements, "eleven" and "twelve".

*Synchronization of driving motor with clock*

Means are provided for synchronizing the driving motor 851 with time in order that the announcement will start at approximately the same number of seconds prior to the time signal in each 15-second interval. Associated with the driving motor is the usual governor and means well known in the art for maintaining approximately constant speed, usually within a few per cent of the desired speed. In addition, the arrangement about to be described checks the position of the film drums once every three seconds, that is, once every revolution of shaft 857; either speeding up or slowing down the driving motor, depending on whether the shaft is behind or ahead of the position necessary to maintain synchronization.

Referring to Fig. 1 it will be noted that counting relays 101a, 104a, 107a, 110a and 113a, when operated, ground lead 165. Also counting relays 103a, 106a, 109a, 112a and 115a, when operated, ground lead 164. Leads 164 and 165 extend respectively, through the right inner and right middle normal contacts of transfer relay 168 connecting, respectively, with leads 181 and 182, windings of relays 141 and 142 to battery. Since the "a" relay of a counting relay pair remains operated for 1½ seconds, and the next higher numbered "a" relay operates one second later, there is a ½-second period in which two successive "a" relays are operated. Therefore, in a given three-second period, relays 141 and 142 are both operated for ½ second, in the following second only relay 142 is operated, in the next ½ second neither relay is operated and in the last one second of the three-second period, relay 141 alone is operated.

Lead 146 which terminates at the left armature of relays 141 and 171 is grounded for, say, ¼ second, once during each revolution of cam 861. Synchronization is maintained so long as this ground pulse occurs wholly within the ½ second interval in each three-second period that relays 141 and 142 are both normal. When the speed of the driving motor becomes greater than that required for synchronization, cam 861 will eventually ground lead 146 before relay 142 releases. In this event a circuit path is completed through the left normal contact of relay 141 and right make contact of relay 142, the right outer normal contact of relay 143 to battery through left winding of relay 144 which operates and locks through its right winding and right inner make contact to ground at the normal contact of relay 145. The right outer make contact of relay 144 closes a circuit not shown but well known in the art, to effect a reduction in the speed of the motor. The left inner make contact of relay 144 extends lead 146 to battery through the middle winding of relay 171 which operates and locks through its left winding and make contact to ground on lead 146. The purpose of relay 171 is to prevent the premature operation of relay 145 in the event relay 142 releases before cam 861 removes the ground from lead 146. It thus assures a decrease in the speed of the motor enduring for a full revolution of shaft 857. Following the opening of the contact at cam 861 relay 171 releases but relay 144 remains locked.

If relay 142 is again in its operated position when cam 861 next grounds lead 146, relay 171 will again operate and release leaving relay 144 operated for another revolution of shaft 857. If, however, the reduction in speed effected by relay 144 is such that the ground on lead 146 occurs when both relays 142 and 141 are normal, relay 145 operates over a path which includes the normal contacts of relays 141, 142 and 171, thereby causing the release of relay 144 which again places the motor speed under control of the governor already referred to.

Conversely, when the speed of the driving motor is below that required to maintain synchronization, cam 861 will eventually ground lead 146 after relay 141 has operated. This causes relay 143 to operate in turn operating relay 171. Relay 143 locks to the normal contact of relay 145 and closes a circuit (not shown) through its left outer make contact which effects an increase in the speed of the motor. The motor continues to run at increased speed until cam 851 grounds lead 146 during the interval that relays 141 and 142 are both released in which event relay 145 is caused to operate thereby releasing relay 143.

Lamps 147 and 148 provide a visual indication of the degree of synchronization. Lamp 148 is lighted during the ½-second period that relays 141 and 142 are both normal, and lamp 147 is lighted momentarily when lead 146 is grounded at cam 861.

*Check of clock pulses and progress of one-second relay group 100*

It was shown that relay pair 122 in Fig. 1 passed through a cycle of operate and release for each two pulses originated by the clock pendulum and, therefore, could be considered the source of "one-per-second" pulses. Relay pair 124 constitutes a similar pair which passes through a cycle of operate and release for each two pulses furnished by relay pair 122. On the first operation of relay 122b following the operation of start key 154 an obvious circuit path is closed at the right inner contact of relay 122b to operate relay 124a. When relay 122b releases, relay 124b operates. When relay 122b operates a second time, relay 124a releases and when relay 122b releases the second time, relay 124b also releases thus completing a cycle.

Two chains of slow release relays check directly the periodic operation and release of relays 124a and 124b and, therefore, indirectly the periodic make and break of the pendulum contact. The first chain consists of relays 126, 127 and 128. Relay 126 is energized whenever relay 124b is normal and relay 124a is operated and also whenever relay 124b is operated and relay 124a is normal. Each of these conditions exists for approximately ½-second in alternate seconds of time with the result that relay 126 is energized for the first ½-second in each one-second period. Similarly, relay 129, the first relay in the second slow release relay chain, is energized for the second ½ second in each one-second period. The combined releasing time of each slow release relay chain is greater than ½ second hence the third relay in each chain, viz., relays 128 and 131 will not release unless some trouble breaks the chain of periodic events initiated by the pendulum. In this case relay 128 or 131 would release and close an obvious path for operating relay 134 whose function will be explained later.

Relay pair 124 performs another function, viz., to check the operation and release of odd- and even-numbered pairs of counting relays in relay group 100. This is accomplished with the aid of relays 132 and 133. Whenever relay 122b releases to cause a "b" relay of an odd-numbered pair of counting relays to operate, it also causes relay 124b to operate. Whenever relay 122b releases to cause a "b" relay of an even-numbered pair of counting relays to operate, it also causes relay 124b to release. An alternate circuit path is, therefore, maintained to hold relay 133 operated; first, from ground at the make contact of an odd-numbered "b" relay through right inner make contact of relay 124b; second, from ground at the make contact of an even-numbered "b" relay through the right outer normal contact of relay 124b. In a similar manner relay 132 checks the release of the operated counting relay pair, first through the right outer make contact of relay 124b to make contacts of even-numbered "b" relays; second, through the right inner normal contact of relay 124b to make contacts of odd-numbered "b" relays. Relay 133 is slightly slow in releasing and relay 132 is slightly slow in operating in order to prevent their functioning falsely during the instant their paths are switched. Should relay 133 release or relay 132 operate, an obvious circuit path is closed for operating relay 134, whose function will be explained later.

It is necessary to release and restart relay pair 124 at the beginning of each 15-second interval in order to maintain the proper checking relations. When relays 101a and 116 operate at the beginning of each 15-second period, the latter causes relay 117 to operate and relay pair 124 to release. Relay 133 is now held through the right outer normal contact of relay 124b, right outer make contact of relay 117 to ground at right make contacts of relay 115b.

When relay 116 releases one-half second later, it recloses the battery feed to the left winding of relay 124b and connects ground through its left outer normal contact, left make contact of relay 117 and previously traced path for operating relay 124a. Relay 117 is slow in releasing so that although its operating path is opened at relay 116 it remains operated long enough to permit relay 124a to operate. When relay 117 does release, relay 124b operates in series with relay 124a. Relay 133 is now held through the right inner make contact of relay 124b and right inner normal contact to ground at left make contact of relay 101b.

Transfer of either machine to clock relays of other set

When relay 134 is caused to operate (in the manner already described) because of failure of the clock or its associated counting relay group 100, it locks through its right winding and right inner contact to ground at locking key 137.

Relay 134, operated, completes a circuit through its left inner make contact, locking key 138 normal, ringer 139 and ringing machine 140. Ringer 139 sounds an audible alarm. An obvious circuit path is closed for flashing lamp 136 under control of interrupter 135. Ground at left outer make contact of relay 134, left inner normal contact of locking key 137, normal contact of locking key 180 to battery through transfer relay 168 which operates in turn operating multi-contact transfer relay 314 over lead 169.

Transfer relay 168, operated, also transfers leads 172, 173, 174, 181 and 182 from contact with leads 118, 162, 163, 164 and 165 to contact with leads 175, 176, 177, 178 and 179, respectively. The last-mentioned group of five leads is designated 413 and terminates at the respective break contacts on the relay in the other clock-operated control circuit corresponding to relay 168. Transfer relay 314, operated, transfers the leads of the selection relays to the group of leads designated 613 (Fig. 6) which terminates at the respective break contacts of the relay in the other clock circuit corresponding to relay 314. In substance lead groups 413 and 613 of each clock-operated control circuit connect with lead groups 166 and 315, respectively, of the other clock-operated control circuit.

It follows that when transfer relays 168 and 314 are operated the control of the associated announcement machine and selection relays is transferred to the counting relays of the other clock circuit. This transfer may be effected manually by the operation of locking key 137 in which case lamp 136 lights dimly when relay 134 is normal or flashes dimly when this relay is operated. Locking key 180 permits the cancellation of the automatic transfer feature.

Checking the output of amplifiers

Included in amplifier 872, in addition to the usual gain control and supervisory features, is an arrangement well known in the art called a "voice-operated device" which closes the circuit of relay 810 whenever the current in the output of repeater 872 is modulated by the output of any film record or by the tone alternator. Relay 810, therefore, checks the circuit continuity between the output of repeater 872 and the light source of the films.

Following the time signal and prior to the beginning of the next pronouncement, relay 810 should be normal. Should a speech cut-in relay remain locked up or crossed with ground the associated film record will be transmitted to amplifier 872 causing relay 810 to operate. During this time cam 858 momentarily grounds lead 860 completing a circuit path through the left normal contact of relay 801, right normal contact of relay 807, left winding of relay 806, left normal contact of relay 741a, to battery through make contact of relay 810. Relay 806, therefore, operates and locks over an obvious circuit path to ground at relay 808.

During the period in which the pronouncement takes place relay 810 operates and releases as the film records pass the light source. Relay 810 is sufficiently slow in releasing to remain operated between successive words of the introductory phrase on film drum 866 but may not remain operated between successive records on the small film drums. It should, however, be operated by the time cam 858 grounds lead 860 momentarily to ascertain if relay 810 is operated. If it is not operated the following circuit path is closed to cause relay 806 to operate: ground on lead 860, left normal contact of relay 801, right normal contact of relay 807, left winding of relay 806, left outer make contact of relay 741a, normal contact of relay 810 to battery. Relay 806 operates in this circuit and locks through its right winding to ground at relay 808.

A check is also made to assure the proper transmission of the time signal tone when relay 828 operates. Following the release of the last operated speech cut-in relay required by the pronouncement it was shown that relay 801 was caused to operate. This relay opens, at its left normal contact, the connection with lead 860 thus preventing relay 806 from being falsely operated should lead 860 be grounded before the time signal is impressed on amplifier 872. When relay 804 operates, causing relay 828 to operate, slow operate relay 805 is also operated and connects ground over the previously traced path to the left winding of relay 806. However, if the tone is impressed on amplifier 872, relay 810 will operate to remove the battery from the left winding of relay 806 before slow operate relay 805 completes its portion of the circuit path. If the tone, due to trouble conditions, is not applied, relay 810 fails to operate and relay 805 is permitted to cause relay 806 to be operated.

Whenever relay 806 operates, it closes an obvious circuit path for operating relay 813 which functions, as will be described later, to transfer the service to the second time announcing machine.

Checking synchronization of the two clock-operated control circuits

With two clock-operated control circuits and associated machines in operation but only one providing the service, arrangements are provided whereby each clock acts as a check on the other.

A continuous check is made to assure that the operated selection relays in each of the two clock circuits correspond one to the other. This is accomplished by a circuit path which includes make contacts on the selection relays in both clock-operated control circuits. As an aid in tracing this path, the corresponding selection relays in the second circuit are shown dotted at A in Figs. 4, 5 and 6. Ground through winding of relay 702, lead 701, right make contact of an operated selection relay in group 600, right make contact of the corresponding selection relay in group 600 in the second clock circuit, lead 614, through make contacts of operated selection relays in groups 510, 500, and 400 of both circuits, lead 703, winding of relay 704 to battery. Relays 702 and 704, therefore, remain operated. Should the circuit path be crossed with ground or battery or become open, either or both relays will release and open an obvious circuit path which holds relay 709 operated. Should relay 709 be caused to release, further announcements are cancelled in the manner to be described later.

Should the 15-second cycle as measured by relay group 100 in each of the two clock-operated control circuits be out of phase by a predetermined amount, relay 709 will be caused to release. Assume the two clock-operated control circuits are out of phase by one second and that the first circuit is leading. When relay 116 in the first circuit operates, marking the end of a 15-second period, it closes a circuit path over lead 158 to battery through winding of relay 706 which operates connecting its winding to lead 170. Lead 170 is cross-connectible to the right armature or normal contact of relays 102a, 103a or 104a, depending on the desired degree of synchronization between the two clock-operated control circuits. Assume lead 170 is connected to the right normal contact of relay 102a where it is extended to ground at the left normal contact of relay 103b.

Relay 706, operated, closes through its right make contact an alternate holding path for relay 709 over lead 183 to ground at the left outer normal contact of relay 168.

When relay 116 releases one-half second after operating, it advances the count in one or more of counting relay groups 200, 210, 230 and 300, in the manner previously described. These, in turn, change the setting in one or more of the selection relay groups 500, 400, 510 and 600, thus opening the previously traced circuit paths for relays 702 and 704, which release. One second after relay 116 operated, relay 102a operates, opening the holding path of relay 706, which releases, in turn opening the circuit path of relay 709.

Figure 7:
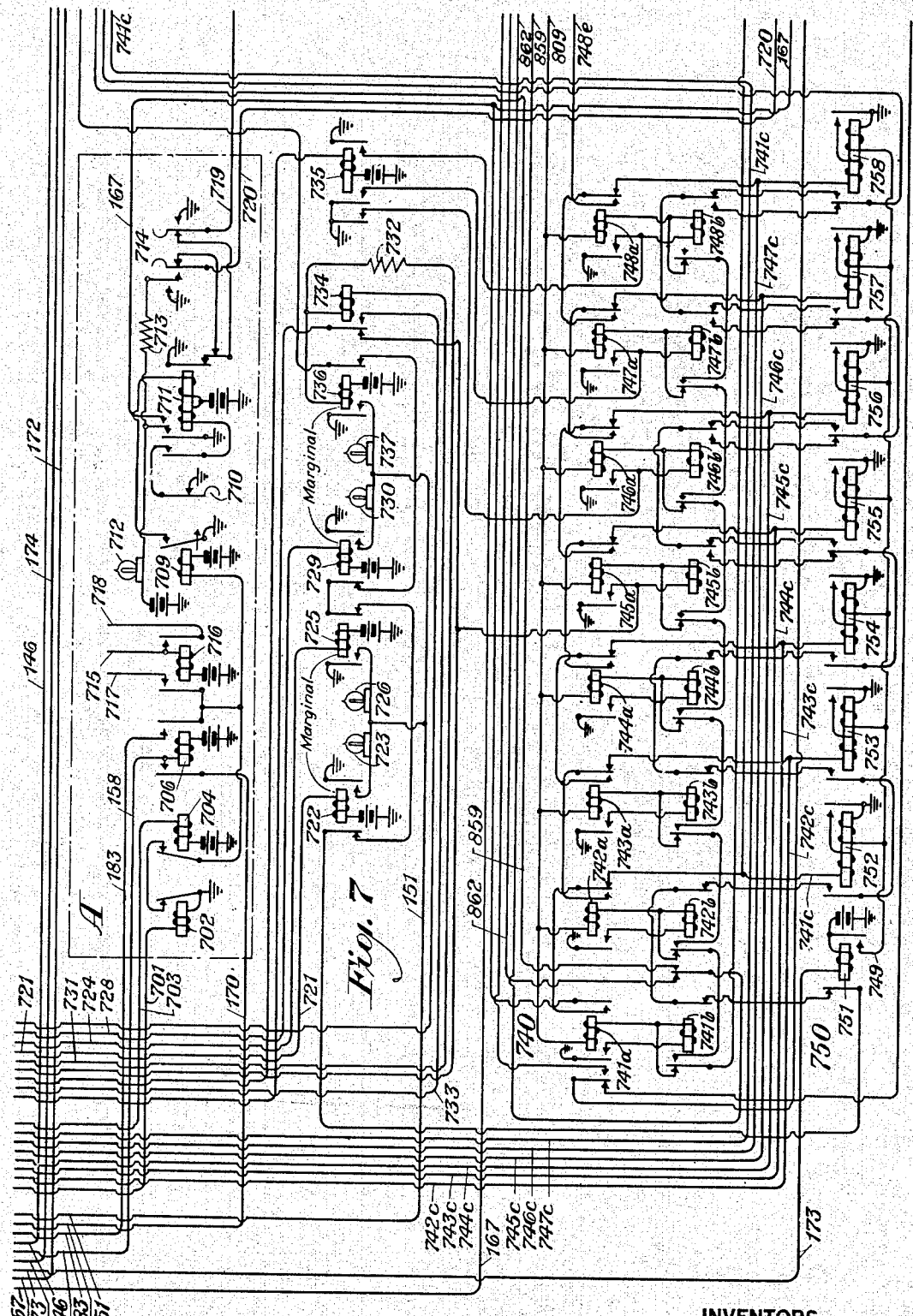

A similar sequence of operations takes place in the second clock-operated control circuit. On the assumption made that the second clock lags behind the first clock by one second, then relay 116 in the second clock-operated control circuit operates one second after relay 116 in the first clock circuit. Relay 716 and leads 715, 717 and 718, shown at A on Fig. 7, are associated with the second clock-operated control circuit in the identical way in which relay 706 and leads 158, 183, and 170 are shown associated with the first clock-operated control circuit. Relay 716, therefore, operates, locks to the associated 102a relay in the second clock circuit over lead 718, and connects ground to the winding of relay 709.

Since relay 709 is slow in releasing, it has not had sufficient time to close its back contact after relay 706 releases and before relay 716 operates.

When relay 116 in the second clock-operated control circuit releases, the same change in the setting of the associated selection relays is made as was made in the first circuit. The previously traced circuit path for operating relays 702 and 704 is, therefore, reclosed, and these relays operate, reclosing the circuit path for holding relay 709 operated, independent of relay 716, which subsequently releases following the operation of relay 102a in the second clock circuit.

It will be seen that when leads 170 and 718 are connected to the normal contacts of their respective 102a relays, the two clocks may not lag by an amount greater than one second plus the releasing time of relay 709; otherwise relay 709 will close its normal contact. By connecting leads 170 and 718 to other points in the respective 100 relay groups, the allowable lag may be increased or decreased in one-half second steps to any desired value. By not connecting these leads to any point, the allowable lag between the clocks becomes one-half second plus the releasing time of relay 709.

When either clock lags or leads the other by a sufficient amount, permitting relay 709 to release, relay 711 is caused to operate over an obvious circuit path. Relay 711 locks to ground at locking key 710, causes lamp 712 to light, and grounds lead 167 for the purpose of operating ringer 139, which sounds an audible alarm.

Relay 711, operated, also removes the ground extended through the normal contacts of locking key 714 to leads 719 and 720, thus releasing relay 818 or 819, depending on which clock-operated control circuit is providing the time service, which cuts off all further time pronouncements.

The synchronizing feature may be cancelled by operating locking key 714, in which case leads 719 and 720 are grounded independently at the key, and lamp 712 lights dimly when the relay is caused to release.

Transfer of service from either machine to the other

Either machine may provide the time pronouncement service, the other then acting as the emergency machine. Arrangements are provided whereby certain trouble conditions will cause an automatic transfer of the announcement trunks to the emergency machine.

Referring to A in Fig. 8, with locking key 812 operated (as shown), a circuit path is closed for operating relay 818. Ground at right normal contact of relay 711, right normal contact of key 714, lead 719, right make contact of key 812, right normal contact of relay 813 to battery through winding of relay 818. Relay 818, operated, connects the output of the first machine to the announcement trunk and places relay 825 under control of the first clock-operated control circuit.

When the two-way locking key 814 is operated to close lower left make contact as shown, a path is prepared for transferring the announcement trunk to the second clock circuit in the event relay 813 is caused to operate. In addition to previously described trouble conditions which cause the operation of relay 813, certain alarm circuits, well known in the telephone art, which function when the source of power used for the drive motor, photoelectric cells, amplifier fails, can be arranged to operate relay 813 over lead 873.

Marginal relay 832, if operated, also closes an obvious path for operating relay 813. Marginal relay 832 does not operate in series with a single speech cut-in relay but should two such relays be caused to operate simultaneously because of a cross in their operating leads the increased flow of current in the winding of relay 832 will operate it.

When relay 813 operates, it locks through its left winding and left inner make contact to ground at key 812. It also lights lamp 811 over an obvious path and connects ground to lead 167 causing ringer 139 to sound an audible alarm. It opens circuit path of relay 818 and closes a circuit path through its right make contact, left contact of key 814, left normal contact of relay 817 to battery through winding of relay 819. Relay 818 releases and relay 819 operates, thus effecting the transfer of service.

What is claimed is:

1. A system of relays including a plurality of relays adapted to be set in correspondence to elements of time, a source of isochronous pulses, connections from said source to said relays to progressively operate the relays, whereby the setting of the relays will periodically correspond to the time of day, a second system of relays similar in character to said first system of relays, and means for electrically comparing the settings of the first system with those of the second system.

2. A system of relays including a plurality of relays adapted to be set in correspondence to elements of time, a source of isochronous pulses, connections from said source to said relays to progressively operate the relays so that the setting of the relays will periodically correspond to the time of day, a second system of relays similar in character to said first system of relays, means for electrically comparing the settings of the first system with those of the second system, and means for indicating discrepancies of predetermined magnitude between the two systems of relays.

3. A system of relays including a group of relays adapted to be set in correspondence to hours, a second group adapted to be set in correspondence to minutes of an hour, a third group adapted to be set in correspondence to fractions of a minute, a source of isochronous pulses, connections from said source to said third group to progressively operate relays of the third group, connections to enable relays of the third group to progressively operate relays of the second group, connections to enable relays of the second group to progressively operate relays of the first group so that the setting of relays in the three groups will periodically correspond to the time of day, a second system of relays similar in character to said first system of relays, means for electrically comparing the settings of the first system with those of the second system, and means for indicating discrepancies of predetermined magnitude between the two systems of relays.

4. A system of relays including a source of isochronous pulses, means for integrating said pulses into fractional parts of a minute, a minute, a ten-minute, an hour, and twelve-hour periods of time, means cumulatively registering such periods of time, checking means responsive to the interruptions of the normal isochronous pulses and also responsive to the failure in the integration of said pulses into fractional minute periods, and means for indicating the operation of the checking means.

5. A system of relays including a plurality of relays adapted to be set in correspondence to elements of time, a source of isochronous pulses, connections from said source to said relays to progressively operate the relays so that the setting of the relays will periodically correspond to the time of day, a second system of relays similar in character to the first system of relays, means for electrically comparing the settings of the first system with those of the second system, checking means responsive to interruptions of the normal isochronous pulses and also responsive to the failure of said relays to progressively operate, and means for indicating the operation of the checking means.

6. A system for announcing the time of day in the form of speech comprising a plurality of photoelectric cells, light sources therefor, a device for interposing records between said plurality of light sources and said photoelectric cells, the records corresponding to sounds of single syllables, parts of words, or entire phrases of speech, a sound reproducing device to reproduce the sounds represented by said records in any desired sequence or combination, a source of isochronous pulses, means for integrating said pulses into uniform successive periods of time, means for registering said periods of time, means controlled by said registering means for periodically preselecting a combination of said cells, means for associating the output of each cell in said combination of cells with said sound reproducing device to make an announcement of the time of day prior to the precise instant of time to which the announcement refers, an audible signal, and means for associating said audible signal with said sound reproducing device to indicate the precise instant of time to which the announcement refers.

7. In a system for periodically announcing the time of day, the combination of a source for generating isochronous pulses, means for integrating said pulses into fractional parts of a minute, a minute, a ten minute, an hour and twelve hour periods of time, means for cumulatively registering such periods of time, a time announcing machine including a series of speech records each having individual inscriptions thereon, such as an introductory phrase, words and syllabic parts of words, and means responsive to registration of said periods of time to periodically preselect a particular combination of speech records and predetermine the order in which the individual speech records of said combination shall be used.

8. In a telephone system for periodically announcing the time of day, a trunk network, subscribers' lines, means for connecting said lines to the network, a source for generating isochronous pulses, means for integrating said pulses into fractional parts of a minute, a minute, a ten minute, an hour and twelve hour periods of time, means for cumulatively registering such periods of time, a time announcing machine including a series of speech records having outputs and each having individual inscriptions thereon, such as an introductory phrase, words, and syllabic parts of words, means responsive to registration of said periods of time to periodically preselect a particular combination of speech records and predetermine the order in which the individual speech records of said combination shall be used, means for amplifying the outputs of said speech records, and means for connecting said outputs to the network, and to the subscribers' lines.

9. A telephone system for announcing periodically the time of day in the form of speech including a pair of duplicate systems, each including a plurality of photoelectric cells, light sources therefor, a device for interposing records between said light sources and said photoelectric cells, said records corresponding to different elements required to make up a time announcement, a source of isochronous pulses for controlling said records, a sound reproducing device to reproduce the sound represented by said records in any desired sequence or combination, and means for placing one system under control of the source of isochronous pulses of the other system.

10. In a telephone system including a central bureau for periodically announcing the time of day, a pair of duplicate systems at the central bureau, each having a source for generating isochronous pulses, means for integrating said pulses into one quarter of a minute, a minute, a ten minute, an hour and twelve hour periods of time, means for cumulatively registering such periods of time, a time announcing machine including a series of speech records each having individual inscriptions thereon, such as an introductory phrase, words, and syllabic parts of words, means responsive to registration of said periods of time to periodically preselect a particular combination of speech records and predetermine the order in which the individual speech records of said combination shall be used, and means for placing the time announcing machine in one system under the control of source of isochronous pulses in the other system.

11. In a telephone system including a trunk network, a central bureau having duplicate time announcing machines, each machine including a plurality of photoelectric cells, light sources therefor, a plurality of shafts, a motor for driving said shafts, film records mounted on said shafts in such manner as to intermittently and successively interpose striations on said film records between said photoelectric cells and corresponding light sources, means for periodically preselecting a combination of film records and predetermining the sequence with which such records shall be used for a particular time announcement, means for connecting the output of a particular group of photoelectric cells with the trunk network; control means for each machine, said control means including a source of isochronous electrical pulses, means for integrating said pulses into fractional parts of a minute, a ten minute, an hour, and twelve hour periods of time, and means for cumulatively registering such periods of time, checking means responsive to interruptions of the normal isochronous pulses and also responsive to the failure in the integration of said pulses into fractional minute periods, and transfer means responsive to the checking means for transferring the time announcing machine associated with one control means to the other control means, so that the means for preselecting film records in the time announcing machine transferred becomes responsive to the registering means in the other control means.

12. A system for announcing periodically the time of day in the form of speech, comprising a plurality of photoelectric cells, light sources therefor, a device for interposing records between said light sources and said photoelectric cells, said records corresponding to different elements required to make up a time announcement, a system of relays including a plurality of relays adapted to be set in correspondence to elements of time, a source of isochronous pulses, and connections from said source to said relays to progressively operate the relays so that the setting of the relays will periodically correspond to the time of day, means to set up said records in sequences or combinations corresponding to the time of day set up by said relays, and means to reproduce sounds determined by said records.

13. A system for announcing periodically the time of day in the form of speech, comprising a plurality of photoelectric cells, light sources therefor, a device for interposing records between said light sources and said photoelectric cells, said records corresponding to different elements required to make up a time announcement, a system of relays including a group of relays adapted to be set in correspondence to hours, a second group adapted to be set in correspondence to minutes of an hour, a third group adapted to be set in correspondence to fractions of a minute, a source of isochronous pulses, connections from said source to said third group to progressively operate relays of the third group, connections to enable relays of the third group to progressively operate relays of the second group, connections to enable relays of the second group to progressively operate relays of the first group so that the setting of relays in the three groups will periodically correspond to the time of day, means to set up said records in sequences or combinations corresponding to the time of day set up by said groups of relays, and means to reproduce sounds determined by said records.

14. A system of relays including a group of relays adapted to be set in correspondence to hours, a second group adapted to be set in correspondence to minutes of an hour, a third group adapted to be set in correspondence to fractions of a minute, a source of isochronous pulses, connections from said source to said third group to progressively operate relays of the third group, connections to enable relays of the third group to progressively operate relays of the second group, connections to enable relays of the second group to progressively operate relays of the first group so that the setting of relays in the three groups will periodically correspond to the time of day, a second system of relays similar in character to said first system of relays, means for electrically comparing the settings of the first system with those of the second system, means for indicating discrepancies of predetermined magnitude between the two systems of relays, and indicating means responsive to the setting of said relays.

CHARLES G. MILLER.
ALLEN R. BONORDEN.